United States Patent
Fischer et al.

(10) Patent No.: US 7,698,112 B2
(45) Date of Patent: Apr. 13, 2010

(54) TETRAHEDRALIZATION OF NON-CONFORMAL THREE-DIMENSIONAL MIXED ELEMENT MESHES

(75) Inventors: Stephen E. Fischer, Wappingers Falls, NY (US); Jeffrey B. Johnson, Essex Junction, VT (US); Ralph W. Young, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 11/294,550

(22) Filed: Dec. 6, 2005

(65) Prior Publication Data

US 2006/0071931 A1    Apr. 6, 2006

Related U.S. Application Data

(63) Continuation of application No. 09/942,419, filed on Aug. 30, 2001, now Pat. No. 7,099,805.

(51) Int. Cl.
G06F 7/50 (2006.01)
G06F 17/50 (2006.01)
G06F 9/45 (2006.01)
G06G 7/48 (2006.01)

(52) U.S. Cl. .................. 703/2; 703/6; 703/10; 716/9; 716/20

(58) Field of Classification Search .................. 703/2, 703/6, 10; 702/13; 716/9, 20
See application file for complete search history.

(56) References Cited

U.S. PATENT DOCUMENTS

| | | | | |
|---|---|---|---|---|
| 5,557,710 | A * | 9/1996 | Amdursky et al. | 345/419 |
| 5,754,181 | A * | 5/1998 | Amdursky et al. | 345/419 |
| 5,768,156 | A * | 6/1998 | Tautges et al. | 716/20 |
| 5,896,303 | A * | 4/1999 | Furkay et al. | 703/2 |
| 6,044,210 | A * | 3/2000 | Nagtegaal | 716/9 |
| 6,377,865 | B1 * | 4/2002 | Edelsbrunner et al. | 700/98 |
| 6,430,590 | B1 * | 8/2002 | Fischer | 718/100 |
| 6,456,289 | B1 * | 9/2002 | O'Brien et al. | 345/473 |
| 6,560,570 | B1 * | 5/2003 | Dohrmann et al. | 703/7 |
| 6,625,938 | B1 * | 9/2003 | Shimada et al. | 52/81.1 |
| 6,697,770 | B1 * | 2/2004 | Nagetgaal | 703/2 |
| 6,826,483 | B1 * | 11/2004 | Anderson et al. | 702/13 |
| 2002/0027485 | A1 * | 3/2002 | Shin | 333/193 |
| 2003/0105614 | A1 * | 6/2003 | Langemyr et al. | 703/2 |

(Continued)

OTHER PUBLICATIONS

"Bounds on the Size of Tetrahedralizations", B. Chazelle et al, 10th Conference on Computational Geometry, ACM 1994.*

(Continued)

*Primary Examiner*—Kamini S Shah
*Assistant Examiner*—Shambhavi Patel
(74) *Attorney, Agent, or Firm*—Joseph Abate; Greenblum & Bernstein P.L.C.

(57) ABSTRACT

A dynamic directory and tetrahedralization method. The dynamic directory of degree of freedom data for elements in a non-conformal mixed-element mesh includes elements subdividable into tetrahedral, in which a respective degree of freedom value is stored for each element, wherein the degree of freedom value is current as element subdivision proceeds. The tetrahedralization method includes providing a non-conformal mixed element mesh comprising elements subdividable into tetrahedra, identifying respective degree of freedom values for the elements in the mesh, and performing element subdivision based on the degree of freedom values of elements in the mesh.

13 Claims, 8 Drawing Sheets

U.S. PATENT DOCUMENTS

2004/0034514 A1* 2/2004 Langemyr et al. ............. 703/2

OTHER PUBLICATIONS

"Polyhedral Modeling", G. Bonneau, Proceedings Visualization '00, IEEE 2000.*

Lohner, Rainald: "Mesh Adaptation in Fluid Mechanics" Engineering Fracture Mechanics vol. 50. 1995.*

Bern, Marshall. "Adaptive Mesh Generation" 2000.*

Dompierre et al. "How to Subdivide Pyramids, Prisms and Hexahedra into Tetrahedra" 1999.*

Bossavit, A. "A New Viewpoint on Mixed Elements", Kluwer Academic Publishers, 1992.*

Schuetze et al. "A Study of Adaptively Remeshed Finite Element Problems Using Higher Order Tetrahedra", Computers and Structures, vol. 54, 1995.*

Price et al. "Hexahedral Mesh Generation by Medial Surface Subdivision: Part II. Solids with Flat and Concave Edges", International Journal for Numerical Methods in Engineering, vol. 40, 1997.*

Sing, Li. "Meshing and Substructuring of 3D Stress Analysis Models", 1994.*

Guy Albertelli, Roger A. Crawfis; *Efficient Subdivision of Finite-Element Datasets into Consistent Tetrahedra*; Department of Computer and Information Science, The Ohio State University; Copyright 1997; pp. 213-219.

Julien Dompierre, Paul Labbe, Marie-Gabrielle Vallet and Ricardo Camarero; How to Subdivide Pyramids, Prisms and Hexahedra into Tetrahdra; Presentation given Oct. 10-13, 1999 at the $8^{th}$ International Roundtable, Centre de recherche en calcul applique (CERCA); pp. 1-7 from the internet.

McGill University, Winter 1999 Projects for 308-251B Data Structures and Algorithms, Project 34, Steiner Trees; pp. 1-9; from internet.

"Emperical Design of Geometric Algorithms", K. Weihe et al., SCG '99, ACM 1999.

"Parallel Multigrid Solver 3D Unstructures Finite Element Problems", M. Adams, et al., SC '99, ACM 1999.

"Progressive Tetrahedralizations", O.G. Staadt et al., IEEE 0-8186-9176-x/98, IEEE 1998.

"Bounds on the Size of Tetrahedralizations", B. Chazelle et al., $10^{th}$ Conference on Computational Geometry, ACM 1994.

"Polyhedral modeling", G. Bonneau, Proceedings Visualization '00, IEEE 2000.

* cited by examiner

TETRAHEDRALIZATION OF NON-CONFORMAL THREE-DIMENSIONAL MIXED ELEMENT MESHES

The present invention is a continuation of U.S. patent application Ser. No. 09/942,419 filed Aug. 30, 2001, now U.S. Pat. No. 7,099,805 the disclosure of which is expressly incorporated by reference herein in its entirety.

FIELD OF THE INVENTION

The invention generally relates to tetrahedralization of meshes, more particularly, to three dimensional tetrahedralization of non-conformal mixed-element meshes.

DISCUSSION OF BACKGROUND INFORMATION

Real-world problems (such as movement of impurities in silicon semiconductor components) sometimes can be modeled and simulated on computers. Many simulators provide output as mixed-element meshes, i.e., meshes including tetrahedral and non-tetrahedral elements. Tetrahedra are three-dimensional shapes with four vertices and four triangular faces. Examples of non-tetrahedral shapes are blocks, pyramids and prisms.

It has been desired to further process the simulator output, such as to run it through visualization or testing software programs. However, some such software programs require input to be tetrahedral meshes, and cannot accommodate non-tetrahedral meshes. Thus, techniques were sought and developed for tetrahdedralizing mixed-element meshes. A particular challenge has been to tetrahedralize a "non-conformal" mixed-element mesh, i.e., one in which triangular element faces can abut quadrilateral element faces in the mesh. Three dimensional tetrahedralization is a well known problem. See, e.g., G. Albertelli, R. Crawfis, "Efficient subdivision of finite element datasets into consistent tetrahedra," IEEE (1997); J. Dompierre, P. Labbe, M. Vallet, R. Camarero, "How to subdivide pyramids, prisms and hexahedra into tetrahedra," Centre de recherche en calcul applique (CERCA), presented at the 8.sup.th International Meshing Roundtable, South Lake Tahoe, Calif. (October 1999), pages 195-204.

To subdivide non-tetrahedra (e.g., prisms and hexahedra) into tetrahedra reduces to selecting how to split each quadrilateral face with a diagonal. For example, prisms have three quadrilateral faces; each quadrilateral face can be split by a diagonal in two different ways; therefore there are eight possible face-splitting combinations for each prism. Only six of these can be subdivided into three tetrahedra without Steiner points; the other two require Steiner points, and produce eight tetrahedra. Similarly, hexahedra have six quadrilateral faces, resulting in $2^6=64$ possible face-splitting combinations. Only 46 of these can be subdivided into five or six tetrahedra without Steiner points; the other 18 are indivisible.

When a non-tetrahedral shape is indivisible, to subdivide it requires creation of a "Steiner point". Additional Steiner points increase the number of nodes and elements in the mesh. Steiner points in the input meshes interfere with the speed and the convergence behavior of software processing the meshes. Conventional approaches to subdividing non-conformal mixed-element meshes into tetrahedral meshes have needed to add relatively many undesirable "Steiner points" to generate the tetrahedral mesh. A Steiner point is a node added to the element interior, usually at its center.

In an initially conformal mesh, there are no initial constraints on how these quadrilateral faces must be split, except that abutting quadrilateral faces must be split in a consistent manner (i.e., the diagonal selected for the face from one element must match the diagonal selected for the face of the adjacent element which shares that face). The Dompierre algorithm can be used in such a non-tetrahedral conformal mesh to subdivide all elements into tetrahedra. J. Dompierre et al, supra. While the Dompierre et al. strategy is very elegant and fast, and requires no Steiner points, it cannot be applied to subdivide initially non-conformal meshes. As Dompierre observes, the problem of subdividing meshes occurs, e.g., in computer graphics where certain meshes must be subdivided into tetrahedra to use efficient algorithms for volume rendering, iso-contouring and particle advection.

In "non-conformal" meshes, abutting triangular faces initially constrain the choice of diagonal for some quadrilateral faces, so that Dompierre cannot be used. These initial constraints can directly or indirectly result in "overconstrained" prisms or hexahedra, i.e., those that cannot be subdivided into tetrahedra without adding Steiner points. In an initial mesh having prisms, hexahedra and tetrahedra, to subdivide the mesh, determinations are needed for splitting each quadrilateral face with a diagonal. Not all possible diagonal choices, for each prism and hexahedra, have a corresponding tetrahedralization. Non-conformalities in an initial mesh constrain the subdivision of some prisms and hexahedra. In some cases, an element may initially be, or may become during subdivision, overconstrained, making a consistent subdivision impossible. In such a case, a Steiner point must be used to subdivide an overconstrained element. Steiner points are undesirable, because they increase the mesh size and reduce the local mesh quality. In FIG. 1, an example of a non-conformal mesh situation is shown, with two tetrahedra abutting a hexahedron's quadrilateral face.

In FIGS. 2A-L, quadrilateral face constraint patterns are shown. FIGS. 2A-D are four divisible cases without a three-diagonal vertex. FIGS. 2E-L are alternating bit pattern cases, with no matched diagonals, no prisms possible; two of the cases are divisible (FIGS. 2K-L), six cases are not (FIGS. 2E-3J). The two divisible cases (FIGS. 2K-L) give five tetrahedra.

For subdividing elements in a non-conformal mixed element mesh, generally, certain random and non-random subdivisions have been proposed. Random subdivision subdivides a randomly selected first element, and each subsequent selection of an element to be subdivided also has no particular geometric basis. For example, a list of elements may be randomly generated, and subdivided in that random order.

Certain non-random approaches have been proposed, that take into account some geometrical feature, e.g., the strategy of Albertelli, et al. for subdividing an initially non-conformal mixed element mesh, i.e., to begin with subdividing the elements in random order, and use a "depth-first-search" subdivision approach. Albertelli's methodology may be imagined as starting randomly with any element, and then moving to an adjacent neighboring element for the next subdivision, each time moving to a neighboring element. While the Albertelli algorithm can subdivide these non-conformal meshes, the resulting subdivided mesh contains an undesirably large number of Steiner points.

Steiner points in tetrahedral mesh input cause interference and slow simulation time (such as by increasing node and element count; and introducing abrupt 2:1 mesh scale changes which degrade convergence). Minimizing added nodes (Steiner points) in tetrahedralizing meshes is important for making those meshes more useable by software applications requiring tetrahedral mesh input.

SUMMARY OF THE INVENTION

The present invention tetrahedralizes a "non-conformal" mixed-element mesh, i.e., one in which triangular element faces can abut quadrilateral element faces in the mesh, with a minimal number of Steiner points. The invention can be applied to non-conformal meshes, and vastly reduces the need for additional nodes, without the need for local transformations on the existing mesh. The invention further does not suffer from drawbacks of Albertelli.

In order to accomplish these and other objects of the invention, the present invention in a preferred embodiment provides a tetrahedralization method, comprising at least the steps of: providing a non-conformal mixed element mesh comprising elements subdividable into tetrahedra, and identifying respective degree of freedom values for the elements in the mesh; and performing element subdivision based on the degree of freedom values of elements in the mesh. In a particularly preferred embodiment of the invention tetrahedralized output is obtained.

The invention additionally provides, as another preferred embodiment, a dynamic directory of degree of freedom data for elements in a non-conformal mixed-element mesh comprising elements subdividable into tetrahedra. The inventive dynamic directory comprises a respective degree of freedom value for each element, wherein the degree of freedom value is current as element subdivision proceeds.

In a particularly preferred embodiment, strategic element subdivision is applied, such as look-ahead, or, when multiple subdivisions of an element are possible, applying a subdivision pattern closest to satisfying Dompierre "global numbering" criteria.

In the invention, degree of freedom for elements in the mesh is treated as nonstatic. The invention advantageously provides for post-subdivision updating of the degree of freedom data, such as updating after each element subdivision or updating after a batch of elements have been subdivided.

Additionally, the invention provides for breadth-first-search subdivision, such as generating nearest newly-constrained elements and subdividing all nearest newly-constrained elements before subdividing a neighbor of a nearest newly-constrained element.

Another preferred embodiment of the invention provides a tetrahedralizing filter, comprising: a receiver for data defined on a non-conformal mixed element mesh comprising elements subdividable into tetrahedra, a processor for the mesh data, wherein the processor dynamically associates individual to-be-subdivided elements in the mesh with a degree of freedom value in an element-by-element degree of freedom directory; and an element subdivider that discriminates on whether to initiate subdivision or hold subdivision based on the degree of freedom directory, with subdivision priority to relatively most-constrained to-be-subdivided elements. The inventive filter optionally includes a subdivision strategizer and/or an updatable directory.

The filter may include a breadth-first-search subdivider that generates nearest newly-constrained elements and subdividing all nearest newly-constrained elements before subdividing a neighbor of a nearest newly-constrained element. A preferred example of breadth-first-search subdivision that may be used in the present invention is as follows: initially select an arbitrary element to subdivide, then subdivide in a breadth-first manner in which after subdividing the first element, each neighbor of the first element is visited and subdivided before visiting second nearest neighbors of the first element; after visiting all the neighbors of the first element, one of the neighbors is arbitrarily selected and then all of its neighbors are visited, after which another neighbor of the first element is selected and then all of its neighbors are visited.

In another preferred embodiment, the invention provides tetrahedralized output data produced by providing a non-conformal mixed element mesh comprising elements subdividable into tetrahedra, and generating data defining respective degree of freedom values for the elements in the mesh; and performing element subdivision based on the degree of freedom values of elements in the mesh, wherein the degree of freedom data is dynamically updated. Advantageously, the invention provides tetrahedralized output including a minimal number of, or no, Steiner points.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE EMBODIMENTS OF THE INVENTION

The present invention in tetrahedralizing an initial non-conformal mesh performs element subdivision based on each element's degree of freedom ("DOF"), i.e., the number of possible remaining diagonal choices that produce a tetrahedralizable element (such as stored DOF data). Most preferably, DOF is treated non-statically, such as updating DOF data for remaining to-be-subdivided elements after an element subdivision. Additionally, and also most preferably, the subdivision of elements having DOF greater than one is strategic, i.e., not random.

Figure 1:
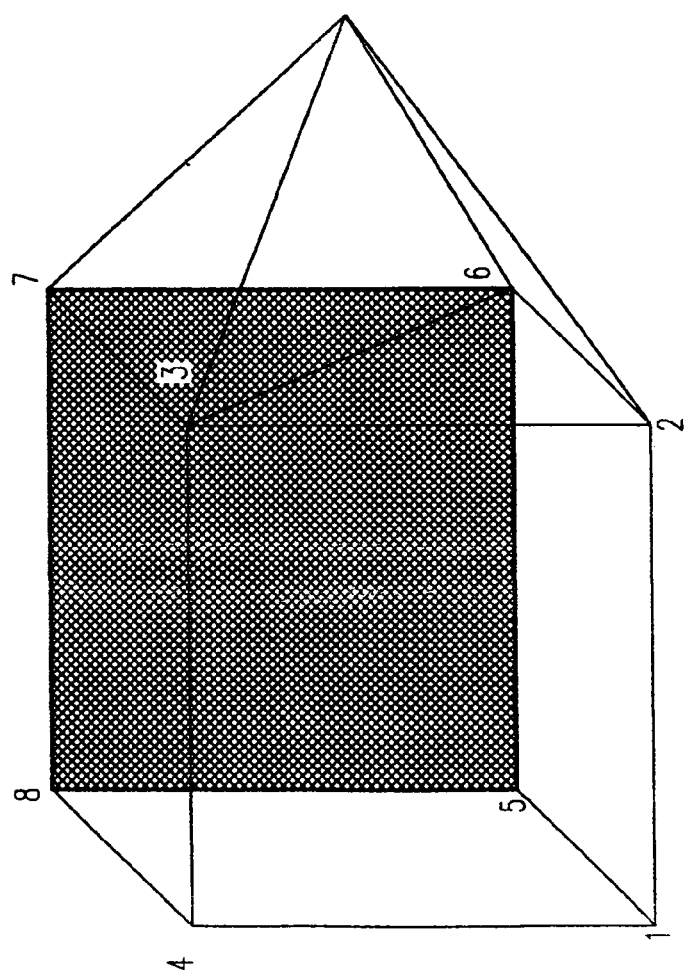
FIG. 1 is a diagram of an exemplary non-conformal mesh situation, with two tetrahedra abutting a hexahedra's quadrilateral face.
Figure 2C:
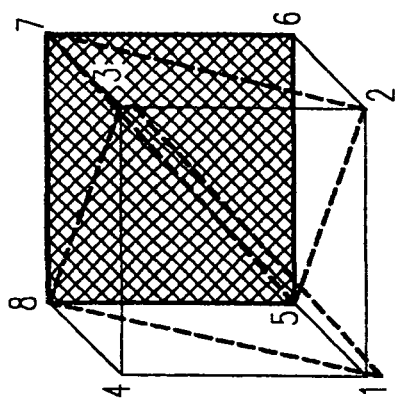
FIGS. 2A-L include diagrams of a subset of the 64 possible quadrilateral face constraint patterns for a block-shaped element.
Figure 2F:
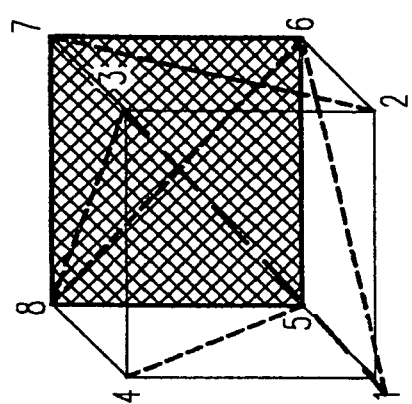
Figure 2B:
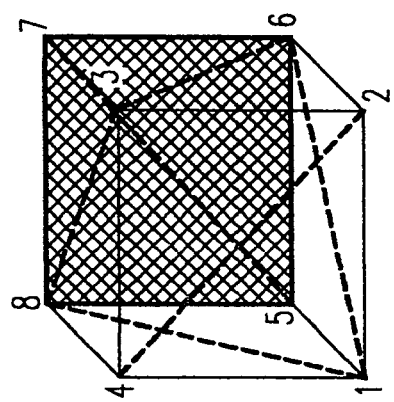
Figure 2E:
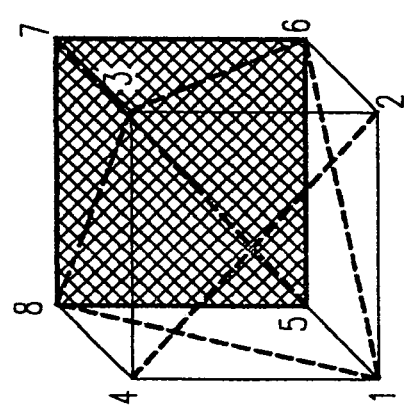
Figure 2A:
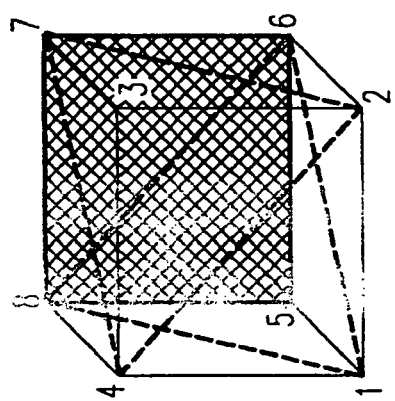
Figure 2D:
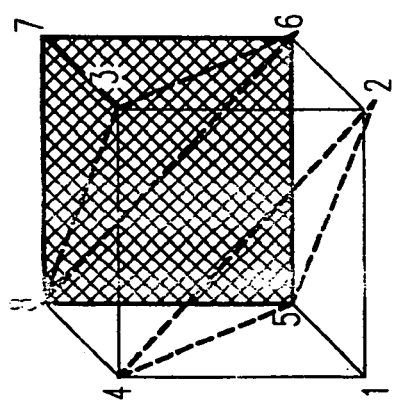
Figure 2I:
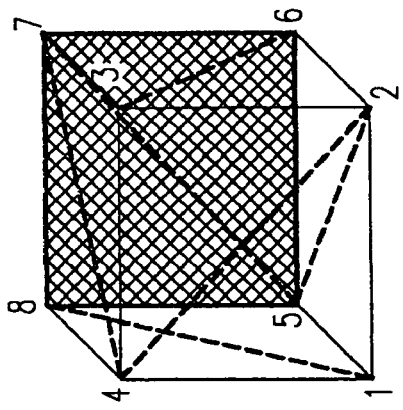
Figure 2L:
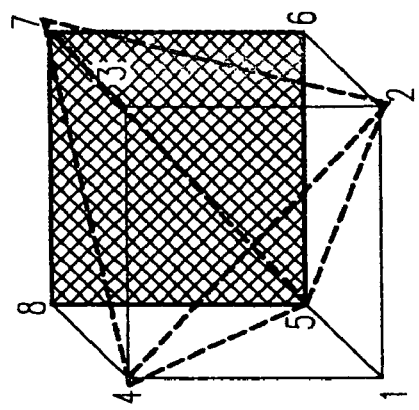
Figure 2H:
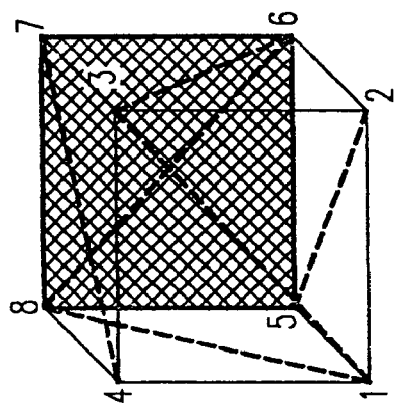
Figure 2K:
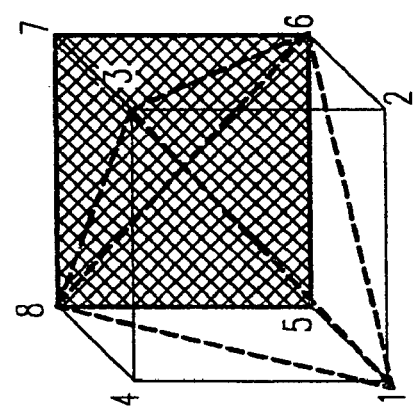
Figure 2G:
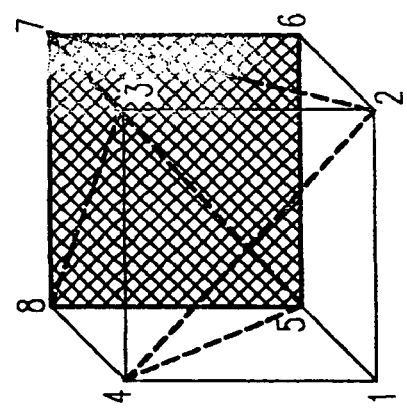
Figure 2J:
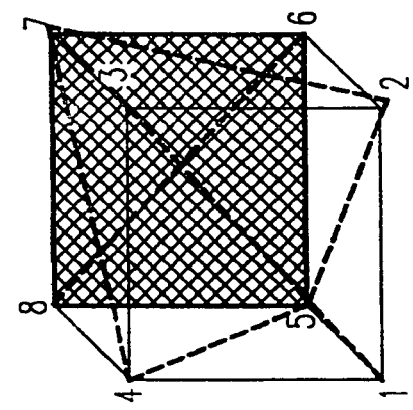
Figure 3:
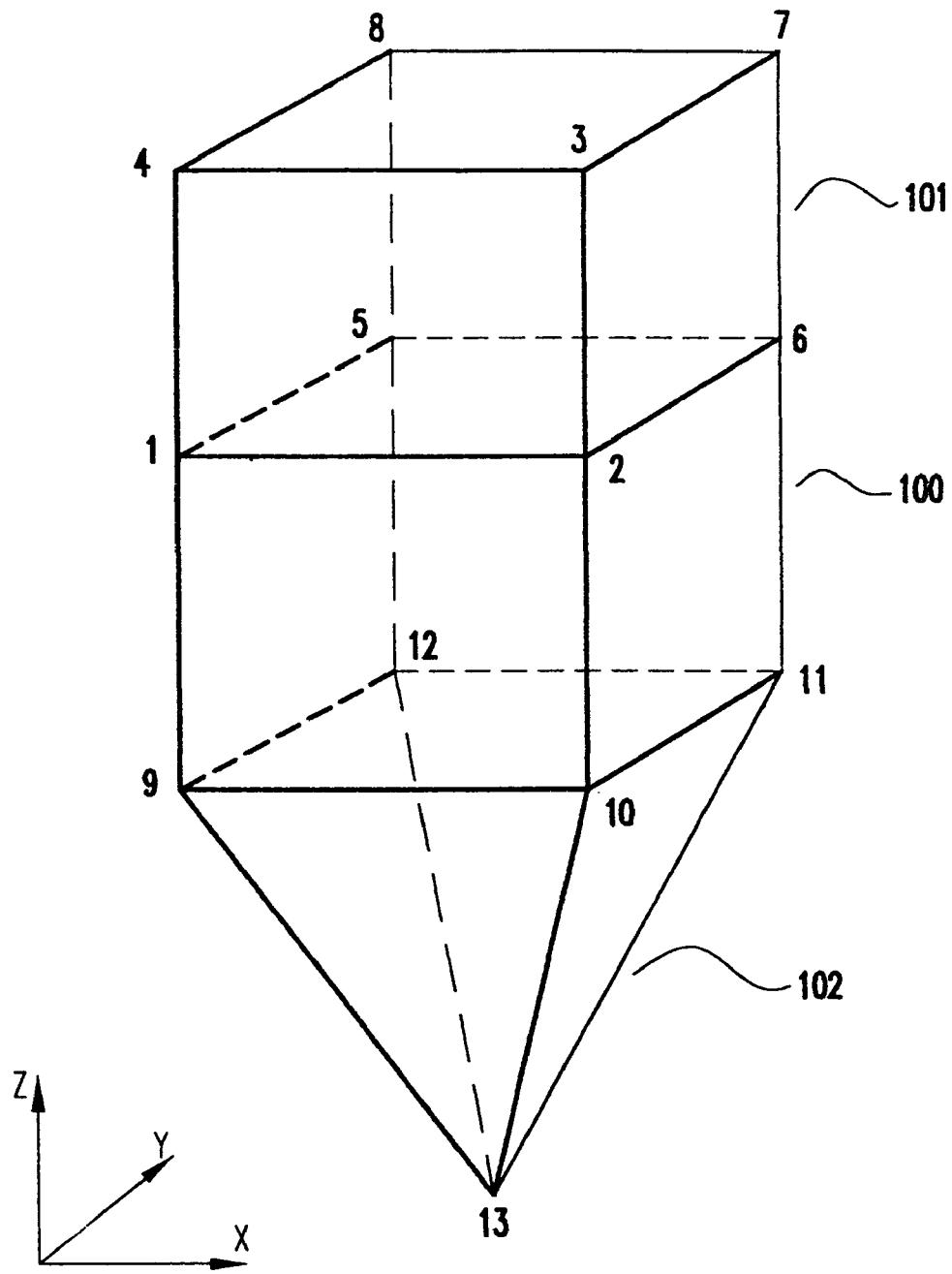
FIG. 3 is a diagram showing global numbering of a three-dimensional mesh.

An initial non-conformal mesh that may be tetrahedralized according to the present invention is any mesh having a combination of elements such as prisms, hexahedra and/or tetrahedra. In the inventive methods, products and processes, the mesh may be three-dimensional. As examples of sources of initial non-conformal meshes may be mentioned output from simulation tools such as Taurus sold by Avanti. The mesh preferably is globally numbered with a number (preferably an integer) assigned to each node. Global numbering is known to those skilled in the art. An example of global numbering of a three-dimensional mesh may be seen with regard to FIG. 3, in which a simple mesh is shown, consisting of blocks 100 and 101 and pyramid 102.

A to-be-subdivided element in the mesh is an element that has a non-zero DOF. An element that has zero DOF, i.e., is over-constrained, cannot be subdivided without the addition of a Steiner point. The initial mesh may, but is not required to, contain one or more elements that are indivisible (i.e., have zero DOF).

DOF determination of a to-be-subdivided element preferably is treated as nonstatic, such as by performing dynamic DOF updating. An example of dynamic DOF updating is, before any subdivision occurs, an initial element-by-element DOF determination followed by, after a subdivision of an element has occurred, a DOF re-determination for some or all remaining to-be-divided elements, such as dividing an element followed by updating the DOF on all its neighbors before dividing another element.

A DOF determination of a to-be-subdivided element results in an integer value, and the DOF of each element is a function of the particular mesh. For an initial non-conformal mixed-element mesh, it is believed that DOF possibilities are 0, 1-10, 13, 14, 23 and 46. In a most preferred example of DOF determination, DOF of each element in the mesh is computed before any subdivision begins, and the DOF values are stored as DOF data, and treated as non-static values subject to later updating. That is, it will be appreciated that the DOF value of each element is not necessarily static, and may change as a result of a subdivision operation. When an element is subdivided, the other elements in the mesh whose DOF could change are the neighbors of the subdivided element. Thus, it is preferred to redetermine DOF for each neighbor element of a subdivided element (which when performed as a computer-assisted calculation is not a particularly "expensive" operation), without determining all remaining elements in the mesh.

Figure 4:
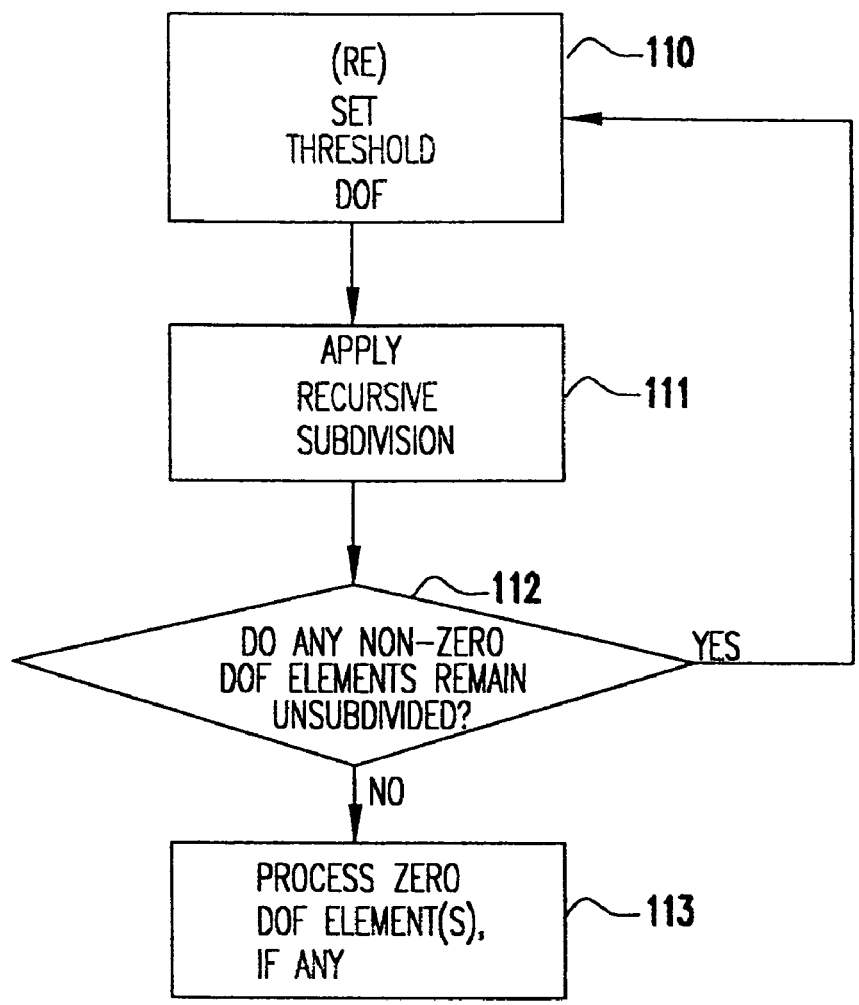
FIG. 4 is a flow-chart of subdivision of elements in a mesh according to the present invention.

Element subdivision based on each element DOF preferably includes subdivision proceeding batchwise from most to least constrained (i.e., lowest to highest DOF) elements. An exemplary subdivision scheme according to the invention may be appreciated with reference to FIG. 4, in which an initial step is provided of setting (110) a threshold DOF (such as 1 or another relatively-low DOF such as 4) and applying recursive subdivision 111 (such as a recursive subdivision algorithm comprising identifying and subdividing undivided elements with DOF less than or equal to the threshold DOF). The threshold DOF may be any non-zero integer, however, most preferably it is selected from the group consisting of 1, 2, 3, 4, 5, 6, 7, 8, 9, 10, 13, 14, 23 and 46. The initial setting of the threshold DOF may be any non-zero integer, but preferably it is a relatively-low DOF (such as 1, 2, 3, 4) and most preferably it is 1. In addition to identifying the relationship of an element's DOF with respect to the threshold DOF, disposition of the element is provided, e.g., a command that if in processing a list of elements in the mesh, an element having a DOF equal to or less than the threshold DOF is encountered, subdivision of that element may proceed, while if an element having a DOF greater than the threshold DOF is encountered, return to the list of elements occurs. Preferably, in carrying out identification of elements equal to or less than the threshold DOF, stored data for DOF values for the elements in the mesh are used.

Once an element is determined to be eligible to proceed to subdivision, element subdivision may proceed for those elements. For example, subdivision may proceed simultaneously of elements having DOF equal to or less than the threshold DOF, or subdivision may proceed element-by-element of elements having such a relatively-low DOF. By way of example, if the threshold DOF is 4, elements having DOF of 4, 3, 2 and 1 would be eligible for subdivision in the batch where the DOF threshold is 4. Of the list of elements having DOF equal to or less than 4, those elements may be taken up for subdivision in random order. In processing the list of elements, thus, where the threshold DOF, a first element subdivided could have DOF of 3, the next element could have DOF of 2, a next element could have DOF of 1, a next element could have DOF of 4, etc., but an element having a DOF of 5 or more would not be taken up for subdividing in that batch. An exemplary example of applying recursive subdivision 111 in FIG. 4 may comprise calling MARKQ (i.e., mark quad) of FIG. 5, i.e., running the recursive subdivision algorithm of FIG. 5 starting with a particular element.

Recursive subdivision (111) may be of a batch of elements, or of a single element. Element subdivision begins with a batch of relatively most-constrained elements or a relatively-most constrained element. A preferred example of recursive subdivision (111) is calling mark q according to the recursive subdivision algorithm in FIG. 5, i.e., running the subdivision algorithm on a particular element in the input mesh. A threshold test for DOF may be built into MARKQ as a MARKQ subroutine.

In subdividing (111), preferably strategic subdivision features and/or box-in avoidance features are included, e.g., not subdividing an element having a DOF greater than the threshold DOF (i.e., holding relatively unconstrained elements for later subdivision); look-ahead (such as confirming that a current subdivision choice results in neighbor elements which can be subdivided without Steiner points); drawing diagonals according to Dompierre rules (such as consistently selecting a diagonal through the lowest-numbered node of the to-be-divided quadrilateral face of the to-be-divided element), use of breadth-first subdivision strategy (e.g., divide all neighbors of current elements before moving on to second nearest neighbors, etc.), etc.

At the conclusion of a subdivision for a first batch of DOF threshold, the mesh usually contains one or more subdivided elements. It will be appreciated that during the subdivision (111) process, the DOF of the remaining to-be-divided elements in the mesh is dynamic, and can be expected to have changed from before the subdivision. Thus, the invention provides for optional post-subdivision DOF recalculation or re-determination. Applying post-subdivision DOF recalculation is highly advantageous and particularly preferred. DOF recalculation may be performed at any time after at least one element has been subdivided. Preferably, after element subdivision (111), DOF recalculation for remaining to-be-subdivided elements previously determined to be above the DOF threshold is performed, to determine if any element should be added to the current subdivision batch. As examples may be mentioned DOF recalculation after subdivision of a single element, or DOF recalculation after completion of a batch of elements.

After subdivision (111), including any optional DOF recalculation, inquiry (112) is made whether any non-zero elements remain unsubdivided, and if so, threshold DOF is reset (110) and undivided elements with non-zero DOF less than or equal to the new threshold DOF are identified and the subdivision (111) process is repeated.

The cycle is repeated until inquiry (112) of whether any non-zero DOF elements remain is negative. At that point, zero DOF (i.e., over-constrained) elements, if any, are processed (113), e.g., by introduction of Steiner points. It will be appreciated that the present invention provides a real-time solution for tetrahedralizing a mesh to provide a minimal number of Steiner points, without necessarily entirely avoiding Steiner points. The present invention includes a heuristic solution that balances the need for quickly obtaining a tetrahedralized mesh with relatively few Steiner points with the vast computation time and resources that would be required to try each possible subdivision scheme, starting from different elements, applying different subdivisions, etc. The present invention thus quickly and reliably provides a tetrahedralized mesh that is satisfactorily input into software applications requiring a tetrahedralized mesh.

It will be appreciated that in effecting the element subdivision (111), when the DOF is one, no choice is available and only one subdivision is possible, however, when the DOF is greater than one, subdivision choices are available. Preferably, in selecting between subdivision choices, a strategic, i.e., a non-random, approach is applied. A strategic subdivision approach permits, but does not require, attempting all subdivision choices.

An exemplary strategic subdivision approach to subdivision (111) includes lookahead confirmation whenever more than one DOF is available for subdividing an element. Lookahead may be to one or more levels, with looking ahead one level being preferred. Generally, looking-ahead more than one level is thought to be relatively too cumbersome, by slowing processing time without achieving benefits worth the burden. The look-ahead comprises confirming which current subdivision choice results in neighbor elements which can be subdivided without Steiner points.

Another strategic approach to subdivision (111) preferably includes, when multiple ways to subdivide the quadrilaterals in an element are possible, selecting a subdivision pattern that comes closest to satisfying the Dompierre "global numbering" criteria.

Figure 5:
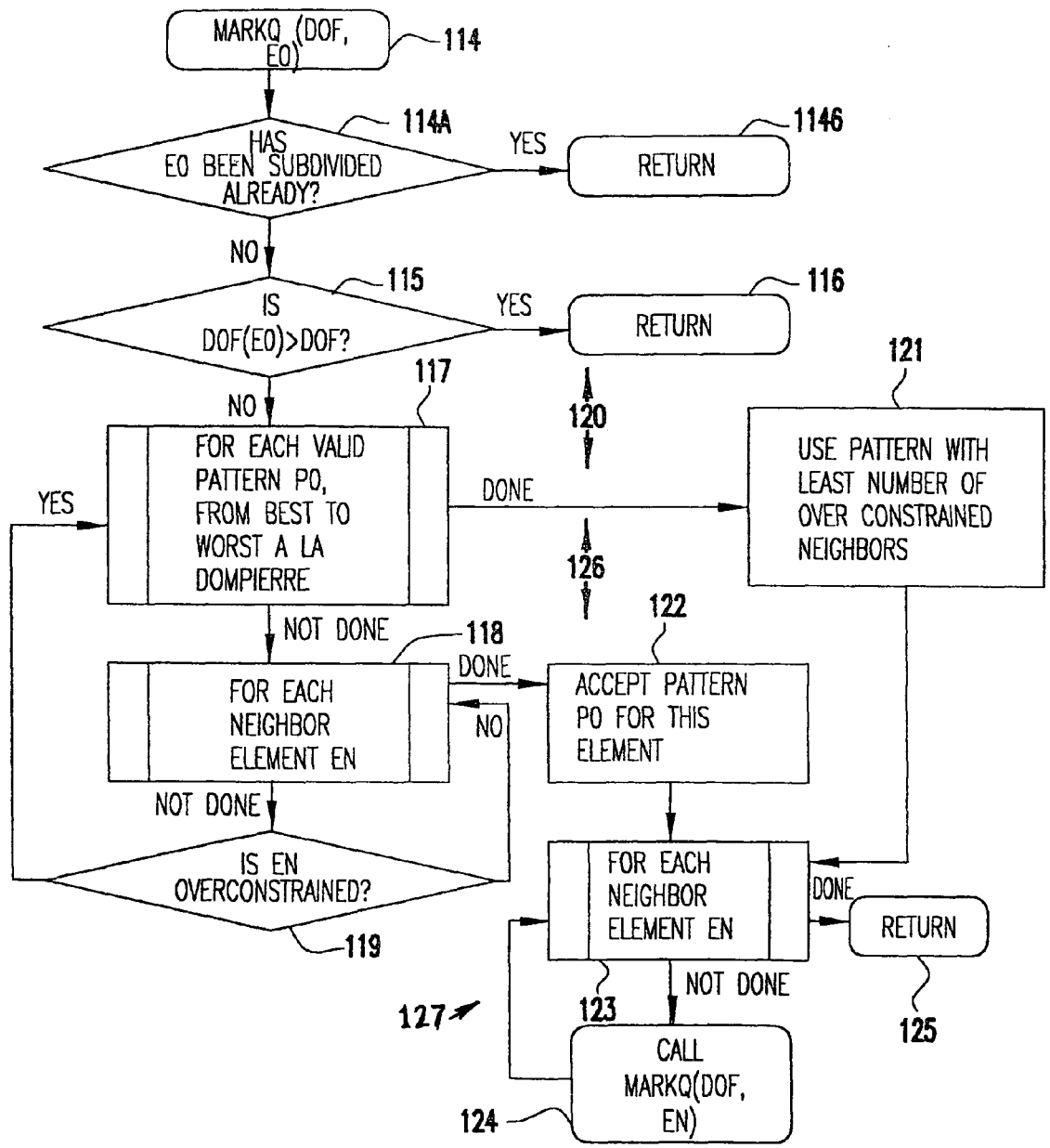
FIG. 5 is an exemplary recursive marking algorithm according to the invention.

The present invention thus provides an enhanced recursive marking algorithm for an initially non-conformal mesh, with an exemplary algorithm being shown in FIG. 5, in which Dompierre pattern scoring 120, one-level look-ahead 126 and a breadth-first marking sequence 127 are used. Initially a threshold DOF is set, and then the algorithm is called (114) for that DOF on every undivided element in the mesh. A screening inquiry (114a) is whether an element E0 (which, particularly as the process begins, may be randomly selected from a list of elements in the mesh) has been subdivided already; if so, return (114b) is provided to the list of elements in the mesh; if not, inquiry is made whether the DOF of the element E0 is greater than the threshold DOF (115). To answer inquiry (115), a table of DOF values for each element in the mesh may be consulted and a comparison made between the DOF value for the element E0 and the threshold DOF. Preferably the table of DOF values is a dynamic directory of DOF values updated as of the last subdivision of an element in the mesh.

If the result of the threshold DOF/element DOF comparison inquiry (115) is that the element E0 DOF is greater than the threshold DOF, then return (116) to the list of to-be-divided elements is provided. If the DOF of the element is less than or equal to the threshold DOF, then the element is passed on for treatment by the subdivision algorithm (117), in which inquiry is made for each valid pattern (i.e., a subdivision pattern which produces a subdividable element, i.e., a collection of diagonal choices) P0, from best to worst a la Dompierre. Inquiry (117) is an example of global numbering feature of the present invention.

In FIG. 5, selecting a subdivision pattern for the element proceeds by ordering the patterns with individual scores according to the number of diagonals which pass through the lowest numbered node in their quadrilateral faces (i.e., Dompierre's strategy for conformal mesh subdivision). The patterns can be sequenced, such that the choose of valid pattern is not random. Work on one element at a time, screening (118) of each valid subdivision pattern is performed from the perspective of the element's neighbors. Valid subdivision patterns are processed in order of most desirable to least desirable (117). In screening each valid subdivision pattern for an element according to the perspective of neighboring elements, the reference point is of one neighboring element at a time. The references to done/not done in FIG. 5 refer to whether the loop has been completed for each neighboring element. Once a loop has been made through all valid patterns from the viewpoint of a neighboring element, the loop is done and one step look-ahead may now be performed for the tentative subdivision pattern. One-step look-ahead shown in FIG. 5 for a tentative subdivision pattern for an element looks at every neighbor of the element being tentatively subdivided and tentatively updates the DOF pattern for all those neighbors. With that tentatively updated neighbor DOF information, inquiry (119) is made whether the DOF of the neighbor element would be zero. If the result of the inquiry (119) is that the neighboring element would not be over-constrained, the inquiry passes to the next neighbor element. If a neighbor element that is over-constrained is encountered, return is provided to inquiry (117) and the next-best valid pattern according to Dompierre is processed. In FIG. 5, one-step look ahead according to the invention comprises the neighbor-by-neighbor (118) inquiry of whether the neighbor is over-constrained (119).

When a valid pattern is being tested in the look-ahead from the perspective of the neighbor elements, if all neighbor elements are processed and none are found to be over-constrained as a result of the pattern, the done path is followed and the pattern is accepted (122) for the element, i.e., a successful pattern has been found. The algorithm of FIG. 5 proceeds in a breadth-first manner for each neighbor EN, of calling and applying the algorithm. Any element that already has been actually subdivided is not subdivided again, tentatively or actually. A tentative subdivision may be confirmed as an actual subdivision, or may be bypassed in favor of a better tentative subdivision which then becomes the actual subdivision.

As shown in FIG. 5, for each neighbor (123), MARKQ is called (124). The process is not done for an element until all neighbors of the element have been processed. When done with all neighbors of an element, return (125) is provided. In FIG. 5, breadth-first-search according to the invention comprises the neighbor-by-neighbor (123) calling of MARKQ (124), i.e., the recursive algorithm.

Returning to block (117) on FIG. 5, the case is addressed where all Dompierre patterns have been processed and none have been found acceptable. In such a case, the done branch is followed and the pattern with the least number of over-constrained neighbors is used (121) and the process continues to block (123).

Practicing the methods of the present invention advantageously results in reducing the number of Steiner points needed to tetrahedralize a typical non-conformal mixed element mesh compared to practicing the Albertelli technique. The reductions achieved by the present invention may be of a factor of two or more, such as a factor of about 16 or 20. By reducing the number of Steiner points, the present invention advantageously provides both the speed and the convergence behavior of software which uses the resulting tetrahedral mesh.

Figure 6:
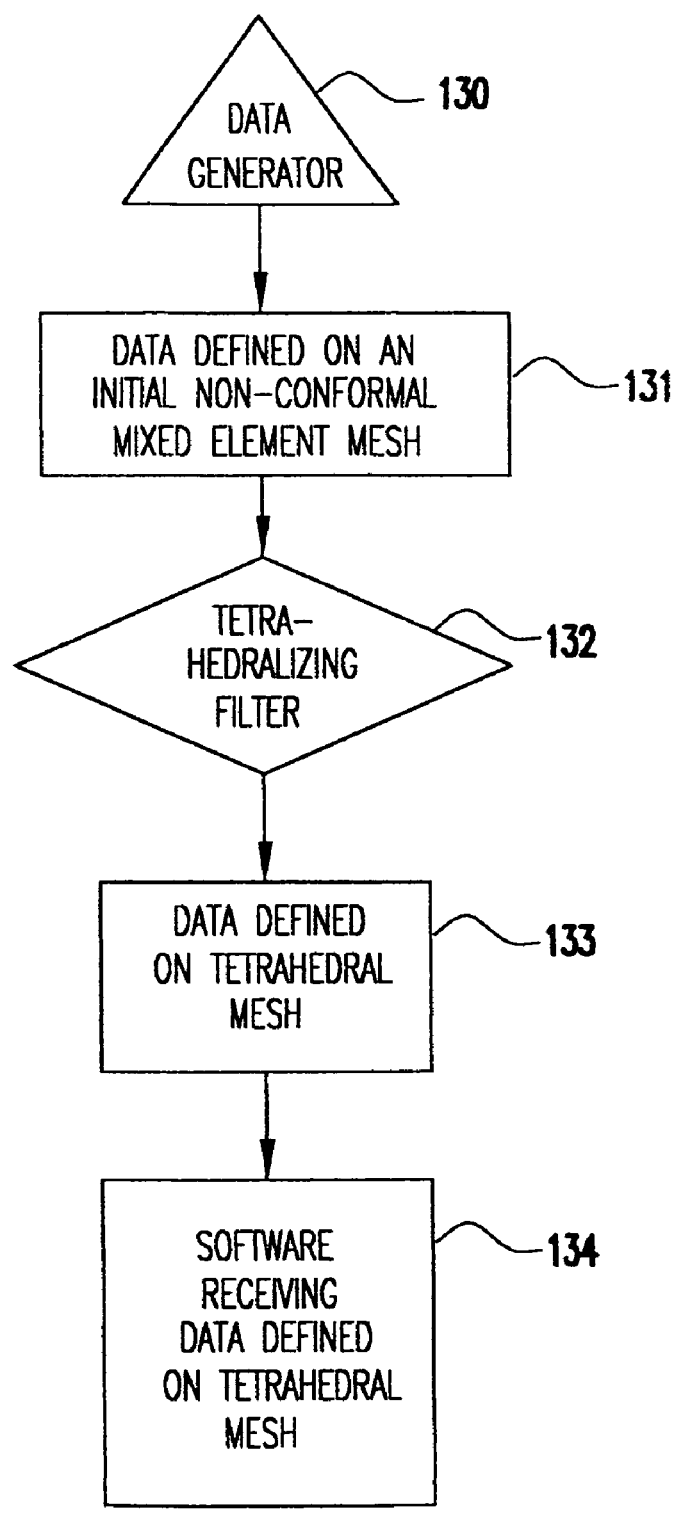
FIG. 6 is a flow-chart of an application using tetrahedralization according to the present invention.

An exemplary process according to the invention may be seen with respect to FIG. 6, which depicts a process in which a data generator 130 (such as finite element or control volume software) produces data defined on an initial non-conformal mixed element mesh 131. The data 131 are entered into a tetrahedralization filter 132 which outputs data 133 defined on a tetrahedral mesh. The data 133 are entered into software 134 receiving data defined on a tetrahedral mesh. A preferred example of the filter is an input filter for a visualization program such as the Data Explorer visualization program, or for three-dimensional process/device simulation, e.g., simulation of a silicon device having an impurity as data defined on a non-conformal mixed element mesh, tetrahedralizing the data, and processing the tetrahedralized data, e.g., as to the movement of the impurity under various conditions of charge, temperature, etc.

Figure 7:
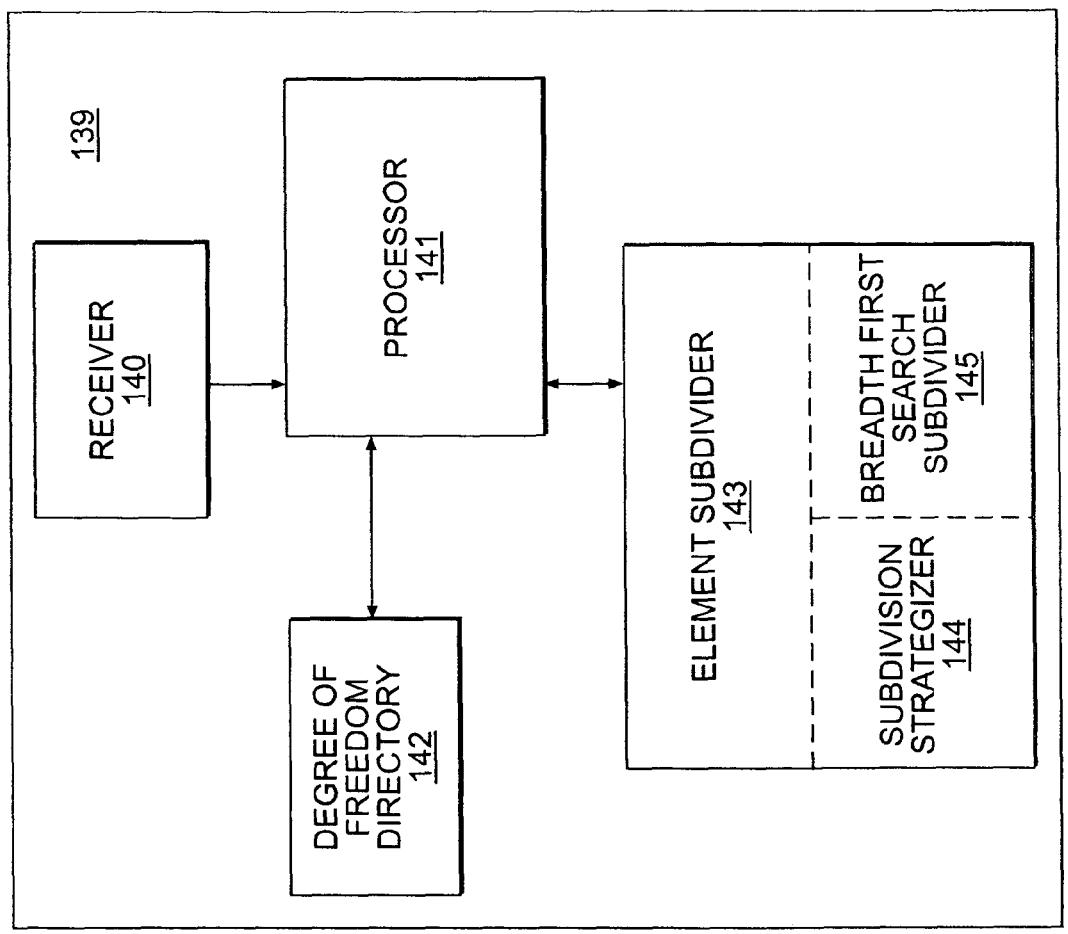
FIG. 7 illustrates a tetrahedralization filter according to the invention.

An exemplary embodiment of a tetrahedralization filter 139 is illustrated in FIG. 7, in which a receiver 140 receives the data defined on the non-conformal mixed element mesh, which is composed of elements subdividable into tetrahedral. A processor 141 for the mesh data is provided to dynamically associate individual to-be-subdivided elements in the mesh with a degree of freedom value in an element-by-element degree of freedom directory 142. An element subdivider 143 discriminates on whether to initiate subdivision or hold subdivision based on the degree of freedom directory, in which subdivision priority is to relatively most-constrained to-be-subdivided elements. Element subdivider 143 can include a subdivision strategizer 144, and the degree of freedom directory 142 can be a dynamic directory, which is updated between element subdivisions. Moreover, element subdivider 143 can include a breadth-first-search subdivider 145 that generates nearest newly-constrained elements and subdividing all nearest newly-constrained elements before subdividing a neighbor of a nearest newly-constrained element.

The present invention reduces the number of Steiner points, and in addition to the three-dimensional simulation mentioned above, has further application in areas where reduction of Steiner points in optimizing connection of a three-dimensional set of data points is desirable, such as in designing pipelines for drainage systems, wiring buildings, setting up networks within offices or larger areas such as states or countries, connecting a number of set locations using the shortest network possible, optimizing sewer systems, power lines, transportation routes, computer assisted design for very large system integration (VLSI) systems, topological network design, communication networks, multiprocessor scheduling, etc.

While the invention has been described in terms of its preferred embodiments, those skilled in the art will recognize that the invention can be practiced with modification within the spirit and scope of the appended claims.

We claim:

1. A tetrahedralization filter of a three dimensional process/device simulation comprising:
a receiver connectable to a data generator generating a non-conformal mixed-element mesh comprising elements subdividable into tetrahedra;
a dynamic directory comprising a plurality of stored degree of freedom values for each subdividable element received from the data generator;
a processor connected to the receiver and to the dynamic directory; and
a three-dimensional process/device simulator,
wherein an updated degree of freedom value replaces one of the plurality of stored degree of freedom values for a subdividable element neighboring an element being subdivided, and
wherein the element subdivision is based on the degree of freedom values in the directory, with ordered subdivision beginning with subdivision of elements having a degree of freedom value lower than a predetermined degree of freedom threshold.

2. A tetrahedralization method in a tetrahedralization filter of a three dimensional process/device simulation, the tetrahedralization filter including a receiver and a processor, comprising:
receiving with the receiver a non-conformal mixed element mesh comprising elements subdividable into tetrahedra from a data generator;
computing in the processor for each element in the mesh respective degree of freedom values;
performing element subdivision based on the degree of freedom values of the elements in the mesh, whereby the elements are subdivided into tetrahedra; and
producing a three-dimensional simulation,
wherein element subdivision comprises assigning a degree of freedom value threshold value;
defining a batch of relatively most-constrained elements as elements having a degree of freedom value less than or equal to the assigned degree of freedom value threshold as a batch.

3. The method of claim 2, wherein element subdivision includes confirming that a current subdivision choice results in neighbor elements which can be subdivided without Steiner points.

4. The method of claim 2, wherein the subdivision includes, when multiple subdivisions of an element are possible, applying a subdivision pattern closest to satisfying Dompierre "global numbering" criteria.

5. The method of claim 2, including maintaining degree of freedom data for elements in the mesh.

6. The method of claim 5, including post-subdivision updating of the degree of freedom data.

7. The method of claim 6, wherein degree of freedom data is updated after each element subdivision.

8. The method of claim 6, wherein degree of freedom data is updated after a batch of elements have been subdivided.

9. The method of claim 2, including breadth-first-search subdivision.

10. The method of claim 9, wherein the breadth-first-search subdivision includes generating nearest newly-constrained elements and subdividing all nearest newly-constrained elements before subdividing a neighbor of a nearest newly-constrained element.

11. The method of claim 2, including obtaining tetrahedralized output.

12. A tetrahedralized output of a tetrahedralization filter of a three dimensional process/device simulation, the tetrahedralization filter including a receiver and a processor produced by a method comprising:
receiving with the receiver a non-conformal mixed element mesh comprising elements subdividable into tetrahedra from a data generator;
computing in the processor data defining respective degree of freedom values for each of the elements in the received mesh;
performing element subdivision based on the degree of freedom values of the elements in the received mesh;
storing, in a degree of freedom directory, the degree of freedom values for each element in the received mesh;
dynamically updating, in the degree of freedom directory, the recorded degree of freedom values at least one of as and after the element subdivision is performed; and
producing a three-dimensional simulation,
wherein an ordered subdivision begins with subdivision of elements having a degree of freedom value lower than a predetermined degree of freedom threshold.

13. The tetrahedralized output data of claim 12, including a minimal number of, or no, Steiner points.

* * * * *